Patented May 16, 1939

2,158,956

UNITED STATES PATENT OFFICE 2,158,956

ARYLAMINO-DERIVATIVES OF 2,4-DINITRO-PHENOL

Edgar C. Britton, Frank B. Smith, John E. Livak, and Winfield W. Sunderland, Midland, Mich., assignors to The Dow Chemical Company, Midland, Mich., a corporation of Michigan No Drawing. Application March 20, 1937, Serial No. 132,084

9 Claims. (Cl. 260—571)

This invention concerns arylamino-2,4-dinitro-phenols having the following formula:

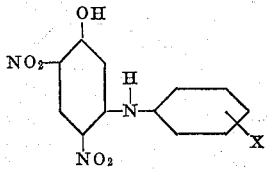

wherein X represents an alkyl, aralkyl, cycloalkyl, alkyloxy, aryl, or aryloxy radical, chlorine, or bromine.

We have prepared representative members of the above group of compounds and have found them particularly useful as insecticides. These compounds are, for the most part, crystalline solids varying from yellow to orange in color. They are substantially insoluble in water but soluble in most organic solvents.

These compounds may be prepared by hydrolyzing a 1-chloro-2,4-dinitro-5-arylamino-benzene compound with sodium acetate. If desired, a high boiling inert material such as acetamide may be employed as a reaction solvent. For example, 1 part of a 1-chloro-2,4-dinitro-5-arylamino-benzene, 1 part of sodium acetate, and from 1 to 2 parts of acetamide are mixed together and heated to a fusion temperature with stirring to cause the reaction. The reaction mixture is then cooled, diluted with an excess of water, and the solid phenolic reaction product separated, as by filtration. This phenolic product may be employed in its crude form for insecticidal purposes, or may be subjected to any of the usual purification procedures.

We have found that the reaction can be carried out at temperatures between 125° and 180° C., although we generally prefer to operate at 150° to 180° C. From one to two hours of heating, depending upon the reaction temperature, is generally sufficient to complete the hydrolysis, although somewhat longer times may be required in the case of certain less reactive chloro derivatives. While anhydrous sodium acetate can be satisfactorily employed as the hydrolyzing agent, we have found that sodium acetate trihydrate ($NaC_2H_3O_2 \cdot 3H_2O$) may be advantageously substituted therefor. Somewhat higher temperatures and longer periods of heating are required when the sodium acetate trihydrate is employed, but tar and by-product formation is thereby reduced with resulting higher yields of the desired phenolic derivatives.

The 1-chloro-2,4-dinitro-5-arylamino-benzene compounds employed, may be readily prepared by reacting 1,5-dichloro-2,4-dinitro benzene with the primary aryl-amines or their hydrochlorides in the presence of sodium acetate trihydrate and in methyl alcohol solution. The reaction is carried out at the refluxing temperature of the reaction mixture, the desired chloro-dinitro-arylamino benzene product precipitating from solution during the reaction. The methyl alcohol is then evaporated from the reaction mixture, the residue thereby obtained being washed with water and recrystallized from an organic solvent to obtain the desired 1-chloro-2,4-dinitro-5-arylamino-benzene in sufficiently pure form to be utilized in the preparation of the corresponding phenol derivative.

The following examples describe the preparation and properties of certain representative members of our new group of compounds, but are not to be construed as limiting the invention.

Example 1

6 parts by weight of 1-chloro-2,4-dinitro-5-(4-chloro-anilino)-benzene, 6 parts of sodium acetate trihydrate, and 7 parts of acetamide were mixed together and warmed to 165°–175° C. for 1.5 hours. The resulting clear solution was cooled, whereby it solidified to a stiff yellow paste. This semi-solid product was made into a slurry with 25 parts of water, and the resulting flocculent precipitate separated by filtration. The residue so obtained was washed with water and dried to obtain 5.7 parts of a crude 2,4-dinitro-5-(4-chloro-anilino)-phenol product. Upon recrystallization from a solvent mixture composed of equal volumes of ethanol and glacial acetic acid, and clarification with bone charcoal, 3.7 parts of substantially pure 2,4-dinitro-5-(4-chloro-anilino)-phenol was obtained as orange needles melting at 178°–179° C.

Among other compounds which have been prepared in a similar manner are the following:

| | M. P. | Form |
|---|---|---|
| | °C. | |
| 2,4-dinitro-5-(2-methyl-anilino)-phenol. | 145 | Fine yellow leaflets or needles. |
| 2,4-dinitro-5-(3-methyl-anilino)-phenol. | 142–143 | Yellow needles out of glacial acetic acid. Yellow plates from ethanol. |
| 2,4-dinitro-5-(4-methyl-anilino)-phenol. | 176–177 | Yellow needles out of ethanol-glacial acetic acid mixture. |
| 2,4-dinitro-5-(4-cyclohexyl-anilino)-phenol. | 155–156 | Yellow needles out of ethanol. |
| 2,4-dinitro-5-(4-ethoxy-anilino)-phenol. | 145–146 | Orange needles out of ethanol. |
| 2,4-dinitro-5-(2-ethoxy-anilino)-phenol. | 155–156 | Yellow needles out of ethanol-glacial acetic acid mixture. |

Among other compounds which may be prepared according to the described procedures, and which are included within the scope of this invention are 2,4-dinitro-5-(4-tertiarybutyl-anilino)-phenol, 2,4-dinitro-5-(2-benzyl-anilino)-phenol, 2,4-dinitro-5-(3-methoxy-anilino)-phenol, 2,4-dinitro-5-(2-phenyl-anilino)-phenol, 2,4-dinitro - 5 - (4 - parachlorophenyl - anilino) - phenol, 2,4-dinitro-5-(4 - phenoxy-anilino)-phenol, 2,4-dinitro-5-(3-chloro-anilino)-phenol, 2,4-dinitro-5-(4-bromo-anilino)-phenol, 2,4-dinitro-5-(4-isoamyl-anilino)-phenol, 2,4 - dinitro - 5-(4-normalpentoxy-anilino)-phenol, etc.

Representative members of the above-described group of compounds have been tested against Fifth-Instar Silkworms by the Leaf-Sandwich method for the estimation of median lethal dose (Campbell and Filmer, Trans. IV. International Cong. Ent. 523–533 (1929); and Campbell, Jour. Econ. Ent. 23:357–370). For example, the median lethal dose of 2,4 - dinitro - 5 - (4 - chloroanilino)-phenol against Fifth-Instar Silkworms are found to be 0.060 milligram per gram of insect body weight. The corresponding value for acid lead arsenate ($PbHAsO_4$) was found to be 0.089. 2,4-dinitro-5-(3 - methyl-anilino)-phenol and 2,4-dinitro-5- (4 - ethoxy - anilino) - phenol, when similarly tested, were found to have M. L. D.'s of 0.083 and 0.120, respectively.

Other modes of applying the principle of our invention may be employed instead of those explained, change being made as regards the method or compounds herein disclosed, provided the steps or compounds stated by any of the following claims or the equivalent of such stated steps or compounds be employed.

We, therefore, particularly point out and distinctly claim as our invention:

1. A 2,4 - dinitro - 5 - arylamino - phenol compound having the following formula:

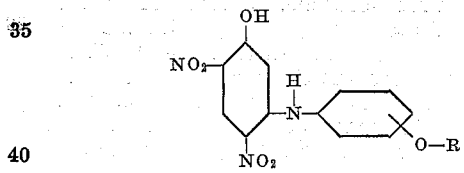

wherein R represents an alkyl radical containing from 1 to 5 carbon atoms inclusive.

2. A 2,4-dinitro-arylamino phenol compound having the formula:

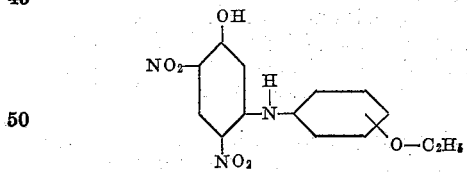

3. 2,4-dinitro-5-(4-ethoxy-anilino)-phenol.

4. A 2,4-dinitro- 5 - arylamino - phenol having the following formula:

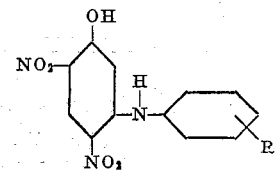

wherein R represents an alkyl radical containing from 1 to 5 carbon atoms inclusive.

5. A 2,4-dinitro - 5 - arylamino - phenol having the following formula:

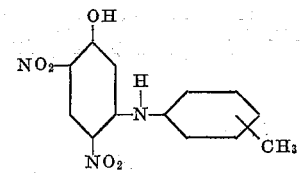

6. 2,4-dinitro-5-(3-methyl-anilino)-phenol.

7. A 2,4 - dinitro - 5 - arylamino - phenol compound having the following formula:

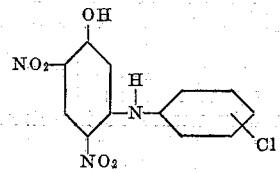

8. 2,4-dinitro-5-(4-chloro-anilino)-phenol.

9. A compound having the following formula

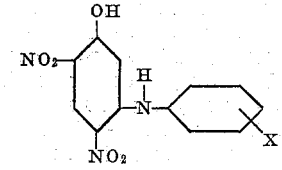

wherein X represents an unreactive substituent selected from the class consisting of lower alkyl, phenyl-lower-alkyl, cycloalkyl, lower alkoxy, aryl radicals of the benzene series, aryloxy radicals of the benzene-oxy series, chlorine, and bromine.

EDGAR C. BRITTON.
FRANK B. SMITH.
JOHN E. LIVAK.
WINFIELD W. SUNDERLAND.